July 1, 1941.  F. H. DOUGHERTY  2,247,652
ANIMAL TRAP
Filed June 12, 1937  2 Sheets-Sheet 1
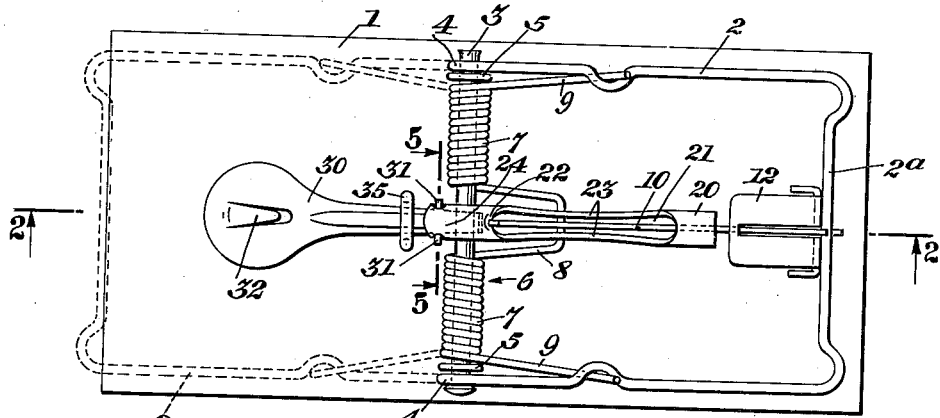
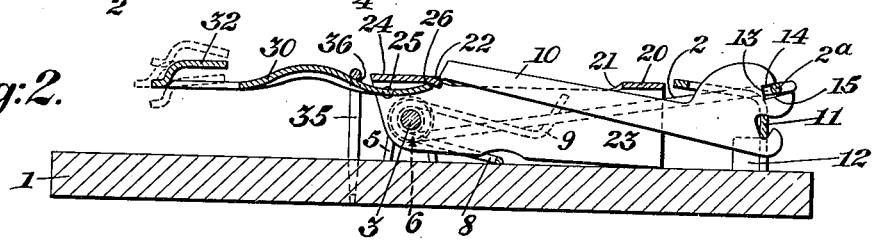
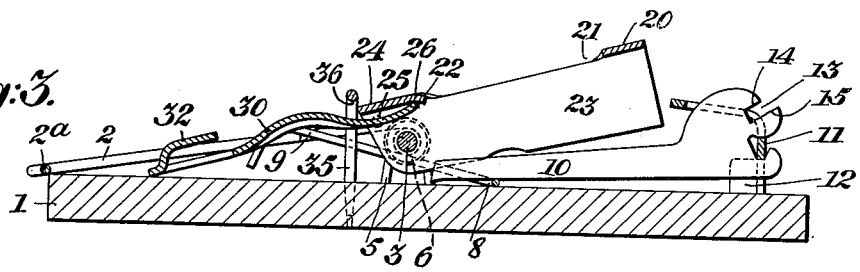
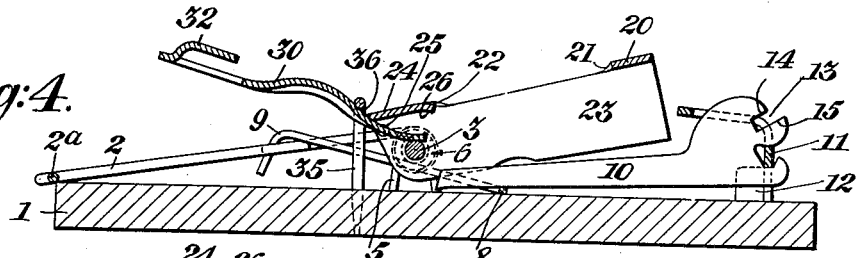
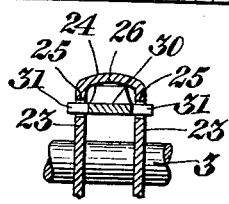

July 1, 1941.　　　F. H. DOUGHERTY　　　2,247,652
ANIMAL TRAP
Filed June 12, 1937　　　2 Sheets-Sheet 2
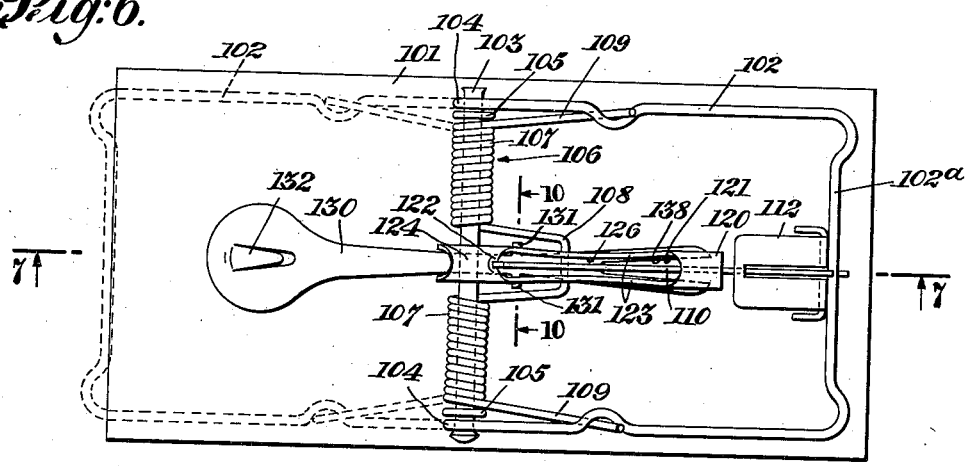
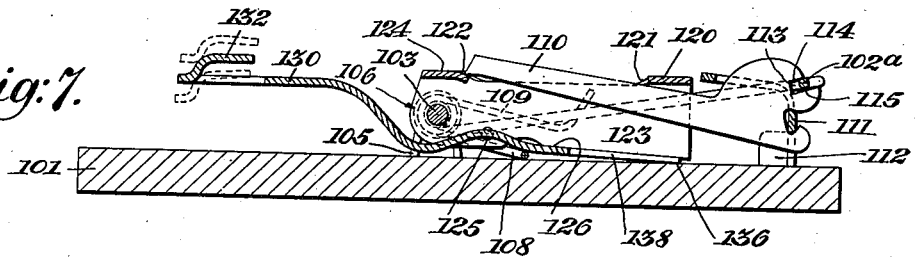
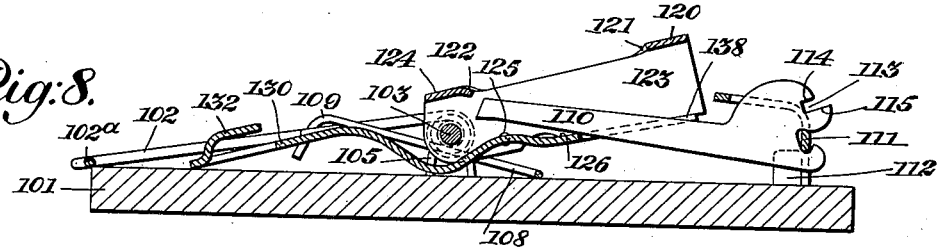
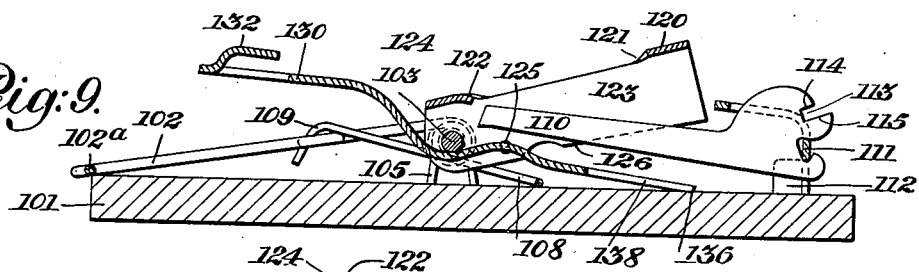
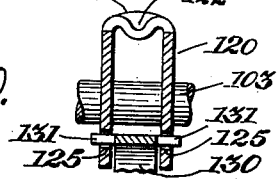

Patented July 1, 1941

2,247,652

UNITED STATES PATENT OFFICE 2,247,652

ANIMAL TRAP

Frank H. Dougherty, Lancaster, Pa., assignor to Animal Trap Company of America, Lititz, Pa., a corporation of Pennsylvania Application June 12, 1937, Serial No. 147,844

18 Claims. (Cl. 43—83.5)

My invention relates to animal traps and consists in the novel features hereinafter described, reference being had to the accompanying drawings which illustrate two embodiments of the invention selected by me for purposes of illustration, and the said invention is fully disclosed in the following description and claims.

The principal object of my invention is to provide an efficient trap having improved and highly sensitive releasing means associated with the bait pedal, whereby a slight movement of the pedal, either upwardly or downwardly, will instantly spring the trap. Another object is to provide an improved trap of this character releasable by a longitudinal outward movement of the bait pedal. A further object is to provide a practical and inexpensive trap construction in which my novel releasing means is embodied in combination with automatic setting means, the setting being accomplished by simply swinging the striker or jaw from the released to the set position. Other and further objects will appear from the following specification.

Referring to the drawings which form a part of this specification:

Fig. 1 is a plan view of an animal trap embodying my invention, shown in set condition, and Fig. 2 is a longitudinal sectional view taken on line 2—2 of Fig. 1.

Fig. 3 is a longitudinal sectional view similar to Fig. 2 showing the trap in its released or sprung condition with the bait pedal depressed to the limit of its downward movement.

Fig. 4 is also a longitudinal sectional view and illustrates the trap in released condition with the bait pedal elevated to the limit of its upward movement.

Fig. 5 is a cross section taken on line 5—5 of Fig. 1, to disclose clearly the means by which the sections of the releasing lever are pivotally connected.

Fig. 6 is a plan view showing a trap embodying my invention in a modified form, the trap being illustrated in set condition.

Fig. 7 is a longitudinal sectional view taken on the line 7—7 of Fig. 6.

Fig. 8 is a similar longitudinal section showing the trap of Fig. 6 in released condition with the bait pedal depressed to the limit of its downward movement.

Fig. 9 is a further longitudinal section and illustrates the trap in sprung condition with the bait pedal elevated to the limit of its upward movement.

Fig. 10 is a cross sectional view, taken on line 10—10 of Fig. 6, clearly disclosing the pivotal engagement of the lever arms.

In accordance with my invention, a trap having a spring pressed jaw or striker and a member for holding the jaw in set position is provided with a pivoted trip lever carrying a trigger for engaging the locking means in the set position of the trap, the trip lever comprising two separate arms, one extending forwardly and forming a bait pedal and the other extending rearwardly to provide a counterbalance or counterweight for the bait pedal, the arms being interengaged for swinging movements in the same direction when the bait pedal is depressed and their engagement being pivotal for relative swinging movements of the bait pedal when raised, so that movement of the bait pedal in either direction will withdraw the trigger from engagement with the locking member and spring the trap.

Referring to the preferred embodiment shown in Figs. 1 to 5 inclusive, 1 indicates the usual rectangular base, the striker or jaw 2 formed in one piece and having a pivot rod 3 extending through eyes 4—4 on the ends of the striker arms, the rod 3 being pivotally connected with the base by staples 5 and the striker being provided with the usual spring 6 which comprises spaced coils 7—7 surrounding the pivot rod. The inner ends of the coils are integrally connected by a web section 8 engaging the base and the outer ends of the coils are provided with arms 9—9 respectively engaging adjacent arms of the striker. A locking member, consisting of a blade 10 is pivotally mounted at 11, adjacent its rear end in a bracket 12 mounted near the rear end of the base. Above the pivot 11 the locking blade has a detent or slot formed therein at 13 to define opposed shoulders 14 and 15, respectively, the upper shoulder 14 being positioned to restrain the jaw in the set position of the trap, as shown in Figs. 1 and 2, and the lower shoulder being positioned for engagement by the crossbar 2a of the striker in setting the trap, to rock the locking blade on its pivot and raise the forward end thereof into trigger engaging position.

Centrally of the base, I provide a counterbalanced trip lever having separate arms 20 and 30 of which the rearwardly extending counterweight arm 20 may be conveniently pivoted with relation to the base on the rod 3 intermediate the spring coils 7 although it may be pivoted on a separate mounting if desired. The counterweight arm preferably consists of a metal strip bent longitudinally to a substantial U-shape and has a longitudinal slot extending for a considerable distance in the top thereof at 21, the forward margin of the slot being depressed to provide a trigger 22 for engagement by the forward end of the locking member 10 in the set position of the trap shown in Figs. 1 and 2, and the downwardly extending side walls 23—23 of the counterweight being inwardly bent for closely guiding the locking member in its pivoting movements. An upper portion 24 of the counterweight arm extends forwardly over the pivot rod 3 and has aligned perforations 25—25 formed in its opposite side walls to receive pivot pins 31—31 projecting integrally from the side edges of the lighter forwardly extending bait pedal arm 30, the arms being thus pivotally connected together.

The bait pedal arm 30 consists of a metal strip formed substantially as shown, and having a tongue 32 upstruck on its forward end portion to provide means for securing bait thereon, and the rearward end of the bait pedal extends beyond the pivotal connection at 31 for abutment against a stop 26 on the underside of the counterweight, thereby preventing relative pivoting of the arms in one direction, while permitting articulation in the opposite direction. A staple 35 is driven into the base astraddle the bait pedal forwardly of the pivotal connection, the loop portion of the staple affording a stop or separate fulcrum 36 for the bait pedal on its upper side.

It will be understood that in the set position of the trap, the jaw or striker is restrained by the shoulder 14 against which it is urged by the spring, thereby pressing the forward end of the pivoted locking blade against the trigger 22 and it will be apparent that upon a forward swinging movement of the counterweight on the rod 3 the trigger will be withdrawn from its set position and will release the locking blade to spring the trap. Such forward or upward releasing movement may be imparted to the counterweight by a disturbance of the bait holding end of the arm 30 either downwardly, upwardly or forwardly, to the extent indicated by the broken lines in Fig. 2. If the bait holding portion of the lever 20 be depressed, both arms of the tripping lever will turn concentrically forward about the rod 3 as though they were integral or rigidly attached together. If the bait holding portion of the pedal be raised, a compound lever movement will result, the forward pedal arm turning rearwardly on the fulcrum 36 and imparting a forward rocking motion to the counterweight at the pivotal connection of the arms. If the arm 30 be moved longitudinally in a forward direction, again forward turning of the counterweight arm will result.

To restore the trap to set position, it is only necessary to swing the striker rearwardly against the resistance of the spring until it engages in the slot defined between the shoulders 14 and 15 of the locking member. As it is swung rearwardly, the jaw impinges against the shoulder 15 causing the locking blade to turn rearward on its pivot 11 and move the shoulder 14 into locking position over the crossbar 2a, the forward trigger engaging portion of the blade swinging upward and momentarily lifting the counterweight as it passes through the slot at 21 for engagement with the trigger.

In Figs. 6 to 10 inclusive, I have shown an embodiment of my invention which retains all the advantages of the construction just described except that the trap cannot be released by a forward longitudinal movement of the bait holding arm. In these figures the parts corresponding with those illustrated in Figs. 1 to 5 inclusive are given the same reference numbers with the addition of 100, to avoid repetition.

In this modification the spring actuated striker and the locking member are constructed and supported exactly as in the preferred embodiment and the counterweight arm 120 of the tripping lever is in all respects similar to the arm 20 except that the aligned perforations 125—125 in its opposite side walls are located rearwardly and slightly below the pivot rod 102 to receive the pivot pins 131, 131 projecting integrally from the side edges of a modified bait pedal arm 130. The arm 130 is formed substantially as shown and extends rearwardly under the rod 103 beyond the pivotal connection for engagement with the lower edges of the counterweight, which afford a stop 126 preventing relative pivoting of the arms when the bait pedal is depressed, and the rearward end portion of the bait arm is bifurcate at 138 to accommodate the locking blade. In this construction the bait pedal fulcrums for rearward turning movement directly against the upper surface of the base, which provides a fulcrum or stop at 136.

Thus constructed, the trap may be sprung by a slight movement of the bait holding end of the arm 130 either downwardly or upwardly, to the extent indicated by the broken lines in Fig. 7. Upon depression of the bait pedal the interengagement of the arms, at 131 and 126, will cause them to turn concentrically forward about the rod 103 whereas upon elevation of the bait holding portion of the pedal, the rear end of the arm 130 will fulcrum on the base at 136 to lift the counterweight at the pivotal connection. The trap may be reset precisely as taught in describing Figs. 1 to 5.

It will be noted that in both embodiments of my invention the separate arms of the tripping lever are interengaged to rock concentrically forward about the pivot rod when the bait pedal is depressed, as the effort and weight arms, respectively, of a simple lever of the first order, and that upon elevation of the bait pedal the arms turn oppositely on separate fulcrums to obtain a compound lever movement. In the preferred embodiment such compound lever movement is that of two interengaged levers of the first order, whereas in the modification shown in Figs. 6 to 10, elevation of the bait pedal arm causes it to turn on its fulcrum 136 as a lever of the second order, and the counterweight arm is thereby moved as a lever of the third order. These functions are attained by reason of the relation of the pivotal connection of the arms and the stops or fulcrums 36 and 136 to the pivot rod. In the preferred embodiment the pivotal connection is located upwardly and forwardly of the rod 3 and the fulcrum 36 is located upwardly and forwardly of the pivotal connection, while in Figs. 6 to 10, the pivotal connection and the fulcrum 136 are arranged downwardly and rearwardly of the rod 103 in that order. In both forms the bait pedal extends rearwardly of the pivotal connection for engagement under the counterweight.

However, the parts may be otherwise arranged and interengaged without sacrificing any of the advantages of my invention, and I desire to have it understood that the foregoing detailed description has been given only for clarity of understanding, and that such changes and modifications may be made as fall within the scope of the appended claims.

What I claim and desire to secure by Letters Patent is:

1. In an animal trap having a base, a spring actuated jaw pivotally supported thereon, a locking member, and a counterbalanced trip lever carrying a trigger positioned for engagement by said locking member in the set position of the trap, that improvement which consists in providing the trip lever with separate bait holding and counterweight portions interengaged to turn in the same direction when the bait holding portion is depressed and their engagement being pivotal for relative movement of the bait holding portion when raised.

2. In an animal trap having a base, a spring actuated jaw pivotally supported thereon, and a locking member, and a pivotally mounted tripping lever carrying a trigger for engagement by said locking member in the set position of the trap, said lever comprising two separate arms, the one a forwardly extending bait pedal and the other a rearwardly extending counterweight for said pedal, said arms being interengaged to turn in the same direction when the bait pedal is depressed and their engagement being pivotal for relative movement of the bait pedal when raised, whereby movement of the pedal in either direction will release the trigger from the locking member and spring the trap.

3. In an animal trap having a base, a spring actuated jaw pivotally supported thereon, and a pivoted locking member, a pivotally mounted counterbalance arm carrying a trigger for engaging said member in the set position of the trap, a separate bait pedal having a pivotal relation with said arm, a stop holding the bait pedal against relative movement with respect to said arm when moved in one direction and a stop for engaging the bait pedal and effecting relative movement between it and said arm when moved in the opposite direction, to spring the trap.

4. In an animal trap having a base, a spring actuated jaw pivotally supported thereon and a pivoted locking member, a tripping lever comprising two separate arms, the one a forwardly extending bait pedal and the other a rearwardly extending counterbalance arm having a pivotal mounting on the base and carrying a trigger for engagement by said locking member in the set position of the trap, a connection linking the arms together for concentric swinging movement forwardly about said mounting, said connection being pivotal for relative swinging movement of the bait holder in a rearward direction, and a separate fulcrum on the base for engagement by the bait pedal when swung rearwardly, whereby movement of the forward end of the bait pedal in either direction will swing the counterbalance arm upwardly to release the trigger from the locking member and spring the trap.

5. A trap comprising a base, a spring actuated jaw pivoted thereto, a pivoted tripping lever having a portion provided with a trigger, a locking blade pivoted to the base and provided at its rear end with a locking detent and a shoulder in the path of the jaw and at its forward end with a trigger engaging portion, said tripping lever having separate bait holding and counterweight portions interengaged to swing in the same direction when the bait holding portion is depressed and their engagement being pivotal for relative movement of the bait holding portion when raised.

6. In an animal trap having a base and a spring actuated jaw pivotally supported thereon, a pivotally mounted counterbalance arm carrying a trigger, a separate bait pedal having a pivotal relation with said arm, a stop holding the bait pedal against relative movement with respect to said arm when moved in one direction, a stop for engaging the bait pedal and effecting relative movement between it and said arm when moved in the opposite direction, a locking blade pivoted to the base and provided at its rear end with a locking detent and a shoulder in the path of the jaw and at its forward end with a portion for engaging said trigger.

7. In an animal trap having a base, a spring actuated jaw pivotally supported thereon, and a pivoted locking member, a tripping lever having a pivotal mounting on the base and carrying a trigger for engaging said locking member in the set position of the trap, said lever comprising two separate arms, the one a forwardly extending bait pedal and the other a rearwardly extending counterweight for said pedal, and a connection linking the arms together for concentric swinging movement forwardly about said mounting, said connection being pivotal for relative swinging movement of the bait pedal in a rearward direction.

8. In an animal trap having a base, a spring actuated jaw pivotally supported thereon, and a pivoted locking member, a tripping lever comprising a counterbalance arm having a pivotal mounting on the base and having portions extending rearwardly and forwardly of its pivotal mounting, said rearwardly extending portion carrying a trigger for engagement by the locking member and said forwardly extending portion, carrying a separate bait pedal, said pedal being pivotally connected to the arm and extending thereunder for engagement therewith rearwardly of the pivotal connection, and a fulcrum for said pedal on the upper side thereof forwardly and above the pivotal connection.

9. A trap comprising a base, a spring actuated jaw pivoted thereto, a locking blade pivoted to the base and provided at its rear end with a locking detent and a shoulder in the path of the jaw and at its forward end with a trigger engaging portion, a counterbalance arm having a pivotal mounting on the base and having portions extending rearwardly and forwardly of its pivotal mounting, said rearwardly extending portion carrying a trigger for engagement by the locking member and said forwardly extending portion carrying a separate bait pedal, said pedal being pivotally connected to the arm and extending thereunder for engagement therewith rearwardly of the pivotal connection, and a fulcrum for said pedal on the upper side thereof forwardly and above the pivotal connection.

10. In an animal trap having a base, a spring actuated jaw pivotally supported thereon, and a pivoted locking member, a tripping lever comprising a counterbalance arm having a pivotal mounting on the base and having a portion extending rearwardly of its mounting provided with a trigger for engagement by the locking member, and a separate bait pedal pivotally connected to the arm rearwardly of said pivotal mounting and extending thereunder for engagement therewith rearwardly of the pivotal connection, the rearward end of said pedal having a fulcrum on the base.

11. A trap comprising a base, a spring actuated jaw pivoted thereto, a locking blade pivoted to the base and provided at its rear end with a locking detent and a shoulder in the path of the jaw and at its forward end with a trigger engaging portion, a counterbalance arm having a pivotal mounting on the base and having a portion extending rearwardly of its mounting provided with a trigger for engagement by the locking member, and a separate bait pedal pivotally connected to the arm rearwardly of said pivotal mounting and extending thereunder for engagement therewith rearwardly of the pivotal connection, the rearward end of said pedal being bifurcate to accommodate the locking member and having a fulcrum on the base.

12. An animal trap including a base, a spring actuated jaw, means for releasably holding said jaw, said means including a three-way movable articulated bi-part treadle carried on said base.

13. An animal trap including a base, a spring actuated jaw, a movable holder cooperating to lock said jaw in operative position, and jaw release means including a three-way movable articulated bi-part treadle carried on said base.

14. An animal trap including a base, a spring actuated jaw, a jaw holder pivotally supported at one end of the base, and an articulated bi-part pivotal treadle cooperating with said holder to releasably lock said jaw in operative position, one part of said treadle being operable in a plurality of directions to cause the other part to operate to release the holder.

15. An animal trap including a base, a spring actuated jaw, a jaw holder, a pivot support extending upwardly at the rear of the trap to carry the holder, and an articulated bi-part pivotal treadle cooperating with said holder to releasably lock said jaw in operative position, one part of said treadle being operable in a plurality of directions to cause the other part to operate in a single way.

16. An animal trap including a base, a spring actuated jaw, a pivot pin supported on the base for pivotally carrying said jaw, and means for releasably holding said jaw, said means including an articulated bi-part treadle with each part pivotally supported on the pivot pin and positioned to provide an elongated member extending forwardly and rearwardly from the pivot pin, one part of said treadle being operable in a plurality of directions to cause the other part to operate in a single way.

17. An animal trap including a base, a spring actuated jaw, a pivot pin supported on said base for pivotally carrying said jaw, and means for releasably holding said jaw, said means including a bi-part treadle with the two parts supported on the pivot pin in horizontal alignment with the adjacent ends of the treadle overlapping, and means on said adjacent ends cooperating to pivotally move said treadle as a single unit upon actuation thereof.

18. An animal trap including a base, a spring actuated jaw, a pivot pin supported on said base for pivotally carrying said jaw, and means for releasably holding said jaw, said means including a bi-part treadle with the two parts supported on the pivot pin, a first part releasing the jaw upon pivoting about a horizontal axis, and the other part operable in three directions to cause said first part to so pivot as to release said jaw.

FRANK H. DOUGHERTY.